Nov. 10, 1925. Re. 16,207
E. E. PHINNEY
KEYBOARD CLEARING MEANS FOR CALCULATING MACHINES
Original Filed March 8, 1920 2 Sheets-Sheet 1
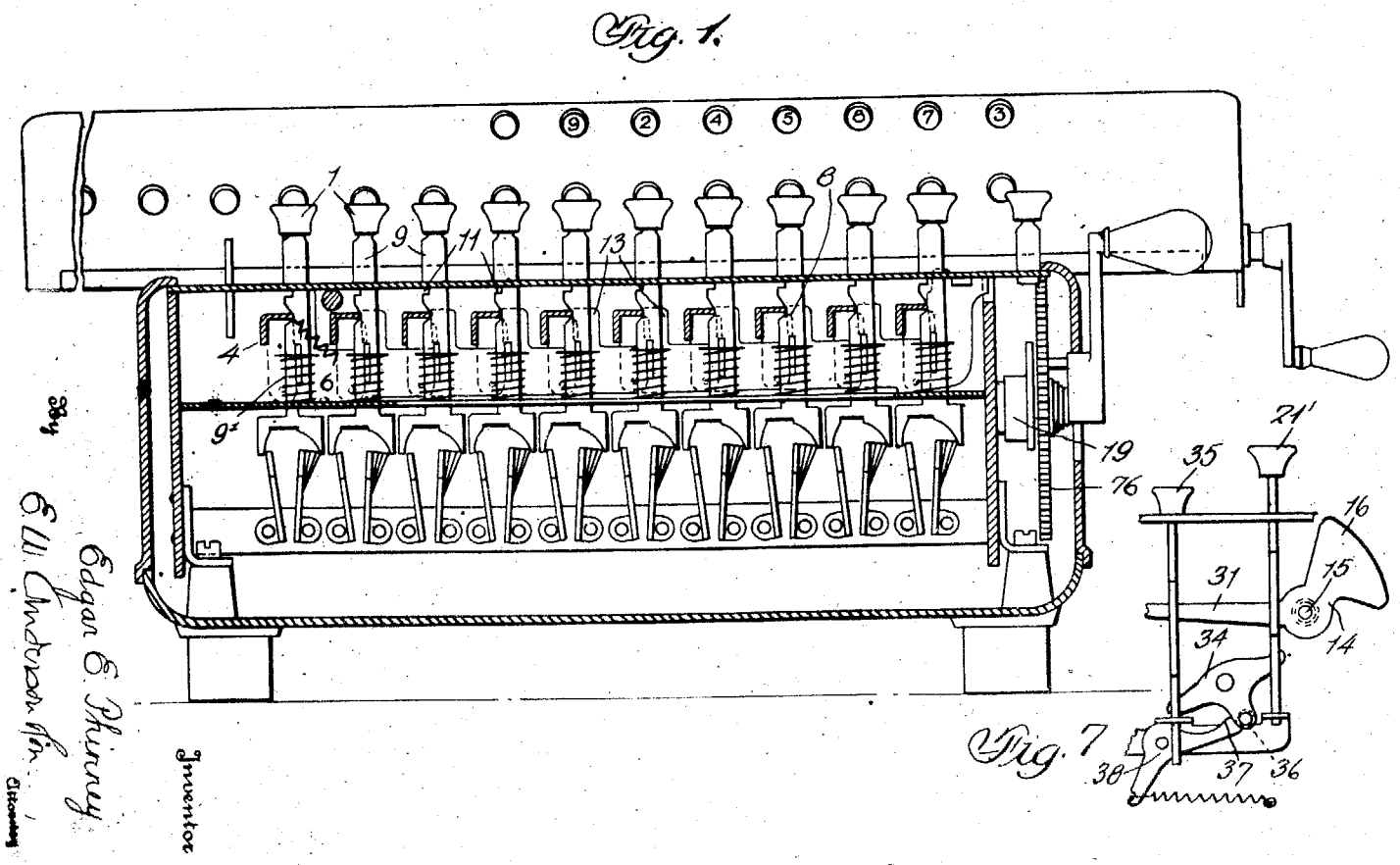

Nov. 10, 1925. Re. 16,207
E. E. PHINNEY
KEYBOARD CLEARING MEANS FOR CALCULATING MACHINES
Original Filed March 3, 1920 2 Sheets-Sheet 2
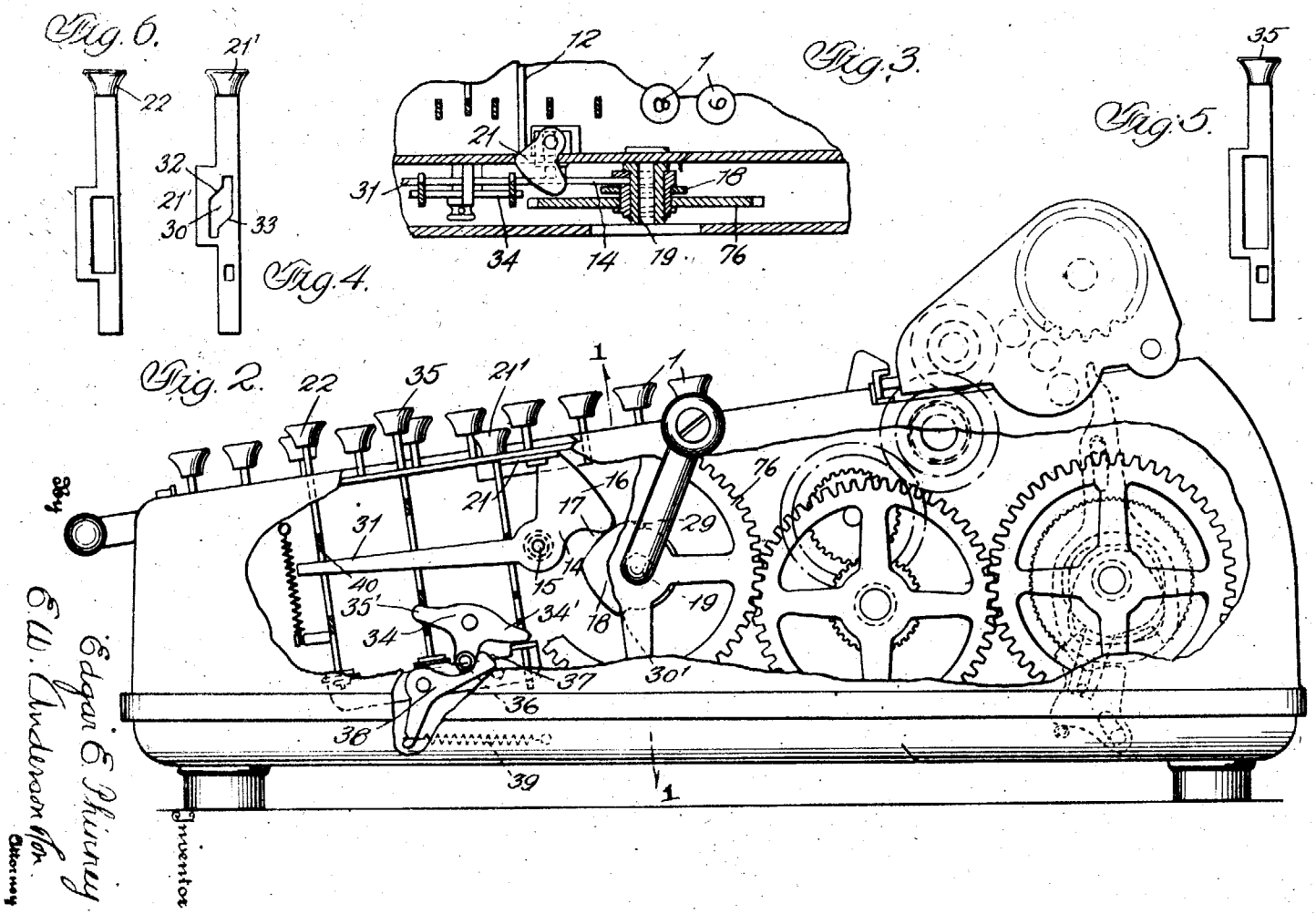

Reissued Nov. 10, 1925. Re. 16,207

UNITED STATES PATENT OFFICE.

EDGAR E. PHINNEY, OF SAUGUS, MASSACHUSETTS, ASSIGNOR TO MONROE CALCULATING MACHINE COMPANY, OF ORANGE, NEW JERSEY, A CORPORATION OF NEW YORK.

KEYBOARD-CLEARING MEANS FOR CALCULATING MACHINES.

Original No. 1,432,616, dated October 17, 1922, Serial No. 364,042, filed March 8, 1920. Application for reissue filed September 21, 1925. Serial No. 57,802.

*To all whom it may concern:*

Be it known that I, EDGAR E. PHINNEY, a citizen of the United States of America, and resident of Saugus, in the county of Essex and State of Massachusetts, have made a certain new and useful Invention in Keyboard-Clearing Means for Calculating Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a sectional view of a machine embodying the invention, taken on the line 1—1, Figure 2.

Figure 2 is a side view of the machine, with the casing partly broken away.

Figure 3 is a detail plan view, with parts in section, of pivoted members 14 and 21, and adjacent parts.

Figure 4 is a detail elevation of the adjusting key.

Figure 5 is a detail face view of the return key.

Figure 6 is a similar view of the clear key.

Figure 7 is a detail side view of the adjusting and return keys and parts operated thereby in positions opposite to those shown in Figure 2.

The invention has relation to means for automatically clearing the keyboards of calculating machines during the stroke or movement of an operating member, said means being operative or inoperative according to the manual adjustment or setting of an element thereof, and an object of the invention is to provide improved key-controlled setting means. Other objects and advantages will appear.

The invention consists in the novel construction and combinations of parts, as hereinafter set forth.

In the accompanying drawings illustrating an embodiment of the invention as applied to a machine of the general type of the patents to Baldwin (reissue) No. 13,841, and to Monroe No. 1,306,606, the numeral 1, designates denominational keys arranged in a plurality of banks or series, the stems 9 of said keys having upper notches 11, and lower notches 8. A rock bar 4 having pressure spring 6, extends parallel to each bank of keys, a lateral edge of said bar normally engaging the lower notches, and being adapted to engage the upper notches to retain the keys in set-up or depressed position against the tension of their springs 9′.

Extending at right angles to the rock bars 4 is an endwise slidable or reciprocatory bar 12, common to all of the rock bars and having upstanding teeth 13 engaging laterally all of the rock bars and adapted upon endwise movement thereof to move all of the rock bars out of engagement with the key stem notches, thereby releasing all depressed keys.

Means are provided to move the slide or bar 12 in one direction to release all depressed keys of the different banks or series as stated, after the key-value registration is completed, consisting of a double-beveled cam member 18, loosely mounted upon the hub of gear wheel 76, with which the operating member or crank handle has driving connection by means of a pin (see Fig. 1). Gear wheel 76 has a pin 29, engaging either of diametrically opposite shoulders 30′ of said cam member according to the direction of movement of the crank handle, and thereby causing said member to rotate or move with said gear wheel, one or the other of the beveled or cam surfaces 17 of said member being thereby caused to engage one arm 16 of a vertically movable lever 14, said lever being fulcrumed upon pin 15, and in turn actuating a horizontally movable lever 21, the latter engaging one end of and actuating said slide 12.

The lever 14 is movable laterally as a whole upon its pivot pin 15, and is thereby brought into or out of the path of movement of the cam member 18, whereby the keyboard is either cleared or not cleared in the operation of the crank handle, according to the nature of the problem being performed, there being no clearing of the keyboard in the performance of multiplication or division which consist of repeated addition or substraction operations.

Means are provided to so move the lever 14 as a whole laterally upon its pivot pin, consisting of a repeat key 21′, the stem of which is provided with a cam slot 30 engaged by the other or tail arm 31 of said lever, and having cam walls 32 and 33, one of which in the depression of said key will shift said lever laterally as stated, and the other of which will in the return movement of the key upwardly, return said lever to normal position.

The repeat key is moved upwardly or returned to normal position as stated, by means of a return key 35, engaging at its lower end at 35′ one arm of a rock lever 34, the other arm of said rock lever having at 34′ operating engagement with the lower end of the repeat key. The keys 21′ and 35 have an operating movement corresponding to that of the denominational or numeral keys 1, that is to say a single rectilinear movement, parallel to the movement of said numeral keys, whereby the key 21′ is set to adjust the lever 14 to operative or inoperative position and to maintain it as adjusted, by engagement of the walls of the cam slot 30.

Means are provided whereby upon partial depression of either the repeat key or the return key to move the rock lever 34 past central or intermediate position, the rock lever and the key depressed are caused to automatically complete the full strokes thereof, consisting of a latch lever 38, one arm of which is provided with a double-beveled cam head 37, either beveled or cam surface of which (according to the direction of movement) is engaged by an anti-friction roller or stud 36 located at the lower end of a central downward extension of said rock lever, thereby actuating the latch lever against the tension of its spring 39 during the first portion of the stroke of the key depressed, until said roller has passed the point of said cam head, the spring of the latch lever then acting to return the same to normal position and engaging the other beveled or cam surface thereof with said roller and actuating the rock lever and the key depressed to automatically complete the strokes thereof. In this way a quick touch upon the repeat or return key will effect a secure setting or lateral adjustment of the lever 14 as stated.

A clear key 22, operable at will, is provided with a longitudinal slot engaged by the tail arm of the lever 14, the upper wall of said slot in the depression of said key causing vertical actuation of said lever to clear the keyboard.

I claim:—

1. In a key-set calculating machine, spring-retracted numeral keys, means for retaining said keys in depressed position, an operating device, means cooperating with said operating device and capable of moving said retaining means to release said keys and clear the keyboard, including an element settable to inoperative position, and a rigid unitary key capable of movement only in a single rectilinear path parallel with the path of movement of the numeral keys, directly engaging said element and settable by a single movement to adjust said element to inoperative or operative position and to automatically maintain it as adjusted.

2. In a key-set calculating machine, spring-retracted numeral keys, means for retaining said keys in depressed position, an operating device, means cooperating with said operating device and capable of moving said retaining means to release said keys and clear the keyboard, including an element settable to inoperative position, and a key capable of movement only in a single rectilinear path parallel with the path of movement of the numeral keys, having a cam wall engaging said element and settable by a single movement to adjust said element to inoperative or operative position and to automatically maintain it as adjusted.

3. In a key-set calculating machine, an operating shaft, spring-retracted numeral keys, means for retaining said keys in depressed position, means for releasing the keys from said retaining means including a cam on said operating shaft and an adjustable lever, and means for adjusting said lever longitudinally of said shaft, into or out of contacting position with said cam, including a depressible key having a cam wall engaging said lever.

4. In a key-set calculating machine, an operating shaft, spring-retracted numeral keys, means for retaining said keys in depressed position, means for releasing the keys from said retaining means including a cam on said operating shaft and an adjustable lever, and means for adjusting said lever longitudinally of said shaft, into or out of contacting position with said cam, including a depressible key having a slot formed with opposite cam walls engaging said lever.

In testimony whereof I affix my signature, this 14th day of September, 1925.

EDGAR E. PHINNEY.